United States Patent [19]

Ando et al.

[11] Patent Number: 4,877,946

[45] Date of Patent: Oct. 31, 1989

[54] CARD ISSUANCE APPARATUS WITH CANCELLATION MODE

[75] Inventors: Makoto Ando; Koichiro Kakinuma, both of Tokyo; Masahiko Sawa, Kanagawa; Hideaki Ohmuro, Chiba; Akira Ohryo, Tokyo, all of Japan

[73] Assignee: Sony Corporation, Tokyo, Japan

[21] Appl. No.: 852,659

[22] Filed: Apr. 16, 1986

[30] Foreign Application Priority Data

Apr. 20, 1985 [JP] Japan .................................. 60-85218

[51] Int. Cl.⁴ ........................ G06F 15/30; G06K 5/00
[52] U.S. Cl. .................................... 235/380; 235/419; 235/379; 235/449
[58] Field of Search .............. 235/379, 380, 419, 432, 235/489, 449, 375, 493; 364/401, 406, 408; 340/825.32, 825.33; 902/22, 24

[56] References Cited

U.S. PATENT DOCUMENTS

| | | | |
|---|---|---|---|
| 3,624,357 | 11/1971 | Wright | 235/489 |
| 3,655,946 | 4/1972 | Morita et al. | 235/380 |
| 3,906,201 | 9/1975 | Housman et al. | 235/380 |
| 3,946,202 | 3/1976 | Taniguchi et al. | 235/380 |
| 4,053,735 | 10/1977 | Foudos | 235/419 |
| 4,321,672 | 3/1982 | Braun et al. | 364/408 |
| 4,341,951 | 7/1982 | Benton | 235/379 |
| 4,467,209 | 8/1984 | Maurer et al. | 235/379 |
| 4,546,242 | 10/1985 | Stockburger et al. | 235/493 |
| 4,635,219 | 1/1987 | Howard | 235/432 |
| 4,650,979 | 3/1987 | Stockburger et al. | 235/493 |
| 4,686,357 | 8/1987 | Douno et al. | 235/419 |
| 4,733,060 | 3/1988 | Dono et al. | 235/449 |

FOREIGN PATENT DOCUMENTS 57-97187 6/1982 Japan .
57-97188 6/1982 Japan .

Primary Examiner—Alan Faber
Assistant Examiner—Robert A. Weinhardt
Attorney, Agent, or Firm—Hill, Van Santen, Steadman & Simpson

[57] ABSTRACT

A card issuance apparatus has an input for inputting data required for issuing a card, a memory for storing the data, a recording device for recording the data in a recording section on the card, a cancellation key, and a cancellation device responsive to operation of the cancellation key for cancelling the data stored in the memory.

8 Claims, 4 Drawing Sheets

CARD ISSUANCE APPARATUS WITH CANCELLATION MODE

BACKGROUND OF THE INVENTION

I. Field of the Invention

The present invention relates to a card issuance apparatus which uses a card provided with a recording section (e.g., a magnetic stripe), and issues a card after predetermined data is recorded on its recording section.

II. Description of the Prior Art

Conventionally, checks have been widely used in settlement of business transactions. When a check is issued, the issuer fills in given items (e.g., date, amount of money, and the like), and gives it to a recipient. The check is subjected to predetermined processing in financial institutions (e.g., a bank or a clearing house, and the amount of money filled in is credited to the account of the recipient or is cashed.

As described above, a conventional check requires various complicated processing procedures in a bank or a clearing house until it is credited to the account of the recipient or cashed. Although some processing procedures can be automated, others must be performed manually. This causes erroneous processing, takes much time, and considerably interferes with systemization of office work. If a check is lost or stolen, it may be used illegally.

When an issuer of a check wants to keep a record of the amount of money, date, and the like, of checks that he issues, he must manually write them in a book each time he issues a check, resulting in time-consuming process and errors. Each time he wants to confirm the record, he must check the book, and cannot always check it at the time and place it is needed. When the book is lost or required information is omitted, there is no means for checking required data. If the book is erroneously managed, the content thereof may be disclosed to a third party. This is similar to systems for issuing various other cards.

SUMMARY OF THE INVENTION

It is an object of the present invention to provide a card issuance apparatus which achieves systemization and high efficiency in distribution systems, and can easily cancel a card which has been issued.

DETAILED DESCRIPTION OF THE PREFERRED EMBODIMENT

Figure 1:
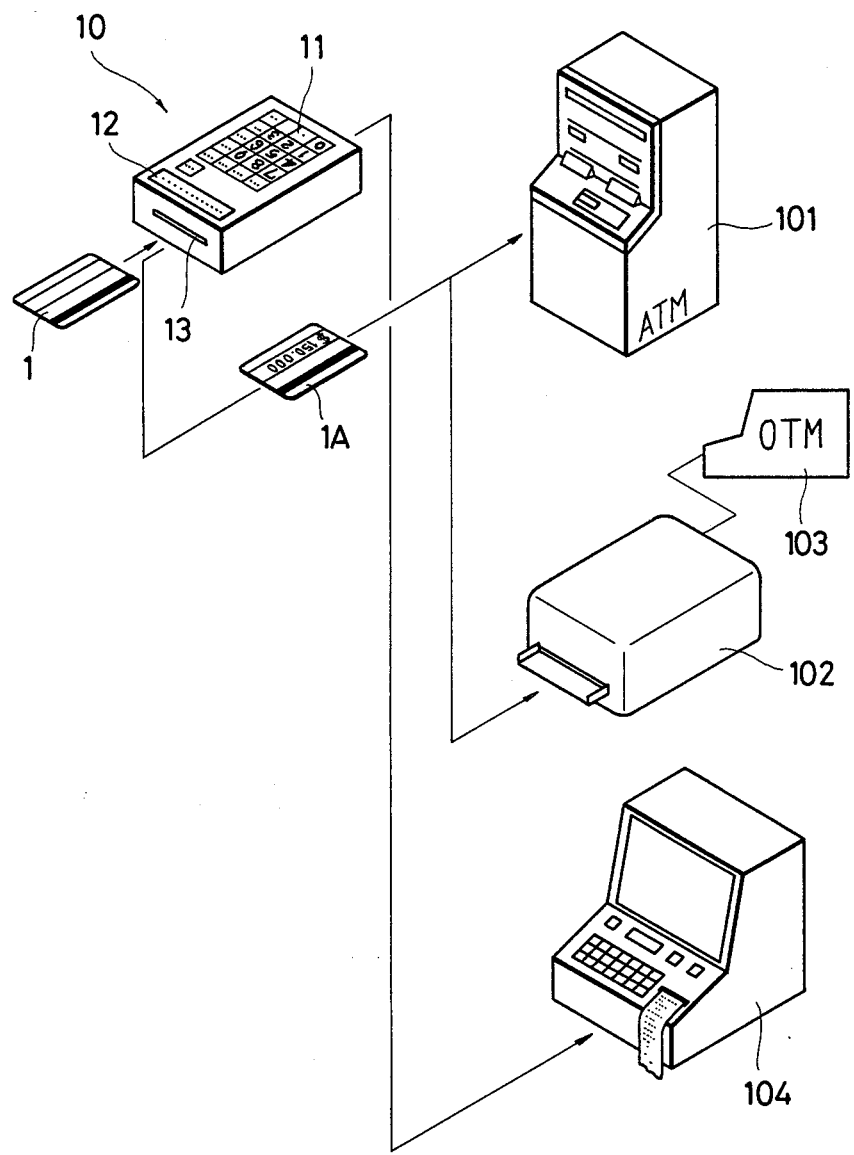
FIG. 1 is an illustration of a check processing system using a check issuance apparatus.
Figure 2:
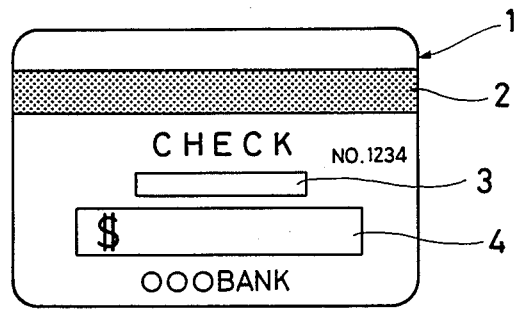
FIG. 2 is an illustration of a check card used in the present invention.

FIG. 1 shows a check processing system when the present invention is applied, e.g., a check card issuance apparatus 10.

Referring to FIG. 1, a check issuer having a checking account, records data including the date, amount of money and the like on a check card 1 supplied in advance from a financial institution using a compact, portable check card issuance apparatus 10. The check card 1 having the data recorded thereon in this manner is issued as a check (to be referred to as a check card hereinafter). The check card 1 has a rectangular shape as in conventional cash cards (quick cards, bank cards and the like) and comprises hard paper or plastic. A magnetic stripe 2 for allowing data read or write is formed on the check card 1. The check card 1 also has a characteristic area 3 in which characteristics data unique to each particular card 1 is optically recorded, and a printing area 4 for printing the amount of money, data and the like. Before a financial institution such as a bank supplies check cards 1 to a customer who opened a checking account with them, the characteristics data recorded in the characteristics area 3 of each card 1 is read by a characteristics reading apparatus and method as disclosed, e.g., in Japanese Patent Disclosure No. 57-97187 or 57-97188. The customer's readout characteristic data and account number are recorded in the magnetic stripe 2 of each card 1. It is to be noted that when a check card 1 is issued, no data is printed on its printing area 4.

When a check card 1 is inserted into a card insertion port 13 at the front side of the check card issuance apparatus 10, the internal convey mechanism receives the inserted card 1. The issuer then inputs necessary data using a keyboard 11 having ten keys and function keys. At this time, the issuer inputs the data while he confirms the input numerical data (amount of money, date and the like) on a display device if above the keyboard 11. When all the input operation is completed, the customer operates a confirmation key on the keyboard 11. Then, the input amount of money, date and the like are printed by an internal printer in the printing area 4 and recorded in the magnetic stripe 2. A check card 1A is thus discharged from the port 13. The card 1A is handed from the issuer to the recipient.

The recipient of the check card 1A inserts it in a card insertion port (a cash card insertion port or a separate check card port) in an ATM (Automatic Teller Machine) 101 installed at a financial institution such as a bank where the recipient holds an account so as to automatically, on-line, credit the amount of money on the card 1A to his account. When this check card 1A is brought to an institution which has issued this particular card 1A, it can be directly cashed. When a bank's official inserts the card 1A into a check card reader 102 connected to an OTM (On-Line Teller Machine) 103 installed at the bank where the recipient holds an account, the amount of money on the check card 1A is credited to this account on-line. When the ATM 101 or OTM 103 is used for crediting the account of the recipient or the check card 1A is directly cashed, the balance of the issuer's account must be sufficient to cover the amount of money on the card. In order to check this, the ATM 101 or OTM 103 confirms the balance of the issuer's account on-line and allows crediting or cashing only when the balance is confirmed to be sufficient.

Each time the check card issuance apparatus 10 of the present invention issues a check card 1A, it stores the amount of money, date and the like in the internal memory. When the amount of money on a specific card must be checked using its issuance date, the date is entered and then the amount of money is displayed on the display device 12. When the amounts of money of check cards 1A must be confirmed in the order they are issued, the sequential display can be obtained by key operation. When the amount of data is large or when all the data must be confirmed, the check card issuance apparatus 10 can be connected to an external printer 104 and the data can be printed out thereby.

The check card issuance apparatus 10 of the present invention can also cancel data once recorded on an issued check card 1A. In this case, however, processing is performed to indicate that all the data in the magnetic stripe 2 and the printing area 4 of the check card 1A has been canceled. For example, "0's" are recorded along the entire magnetic stripe 2. Characters or numbers printed in the printing area 4 are processed to indicate that they have been printed once but canceled thereafter. When the check card 1A is canceled in this manner, the corresponding data in the internal memory of the apparatus 10 is also erased. If this data is not erased, the actual total amount of money remitted may not coincide with data of the total amount of money stored in the memory, and then the incoming and outgoing of said customer's account do not match. In order to prevent this, in the present invention, when a check card 1A is canceled, the corresponding data is also erased from the internal memory.

Figure 3:
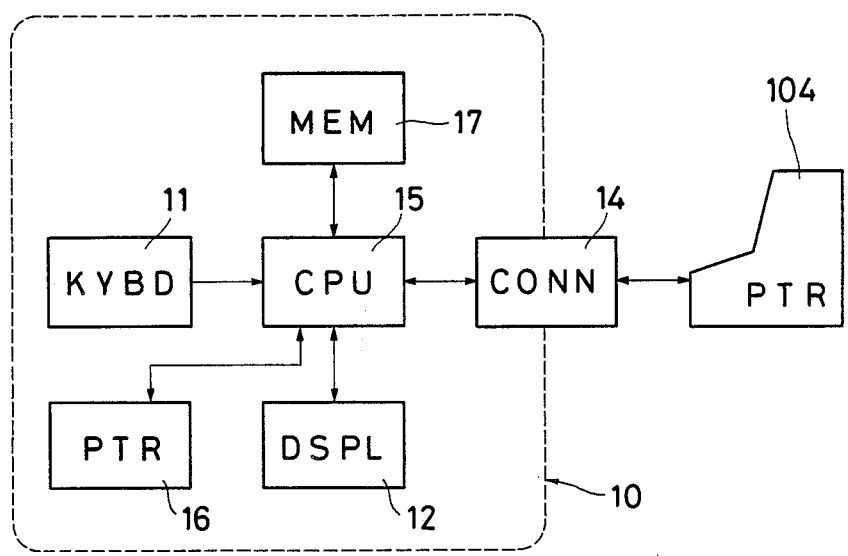
FIG. 3 is a schematic block diagram of a check issuance apparatus.

FIG. 3 shows a circuit configuration of the check issuance apparatus 10, and the same reference numerals as in FIG. 1 denote the same parts in FIG. 3.

Referring to FIG. 3, a control circuit 15 comprising a CPU and the like controls the display device 12 and an internal printer 16, writes data such as the date or amount of money in a memory 17, and reads out data from the memory 17 in accordance with an operation at the keyboard 11. When the external printer 104 is connected to the apparatus 10 through a connector 14, the contents of the memory 17 can be printed.

Figure 4:
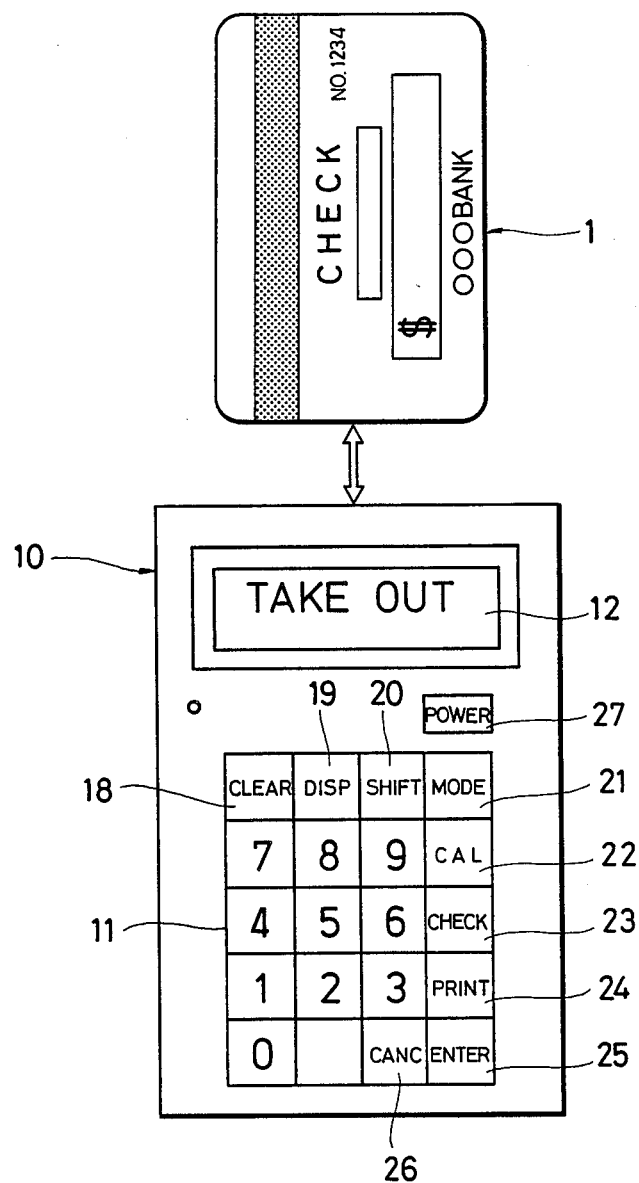
FIG. 4 is a plan view of the check issuance apparatus.

FIG. 4 shows a control panel with the keyboard 11 in the check issuance apparatus 10.

The control panel has ten keys 0 to 9, a clear key 18, a display key 19, a shift key 20, a mode selection key 21, a calculator key 22, a check key 23, a print key 24, an enter key 25, a cancel key 26, a power on/off key 27, and the display device 12.

The mode selection key 21 is used to select the check issuance mode, the data read mode, and the like. The shift key 20 is used to change the date, time and the like. The check key 23 is used to check a check card 1A which has been credited to the account of the recipient or cashed and has been returned to the issuer. The enter key 25 is used to confirm input of predetermined data when a check card 1A is issued. When the calculator key 22 is pushed, the check issuance apparatus 10 can be used as a normal calculator. It is to be noted that the check issuance apparatus 10 is rendered operative only when a password known to the issuer alone is entered.

Figure 5:
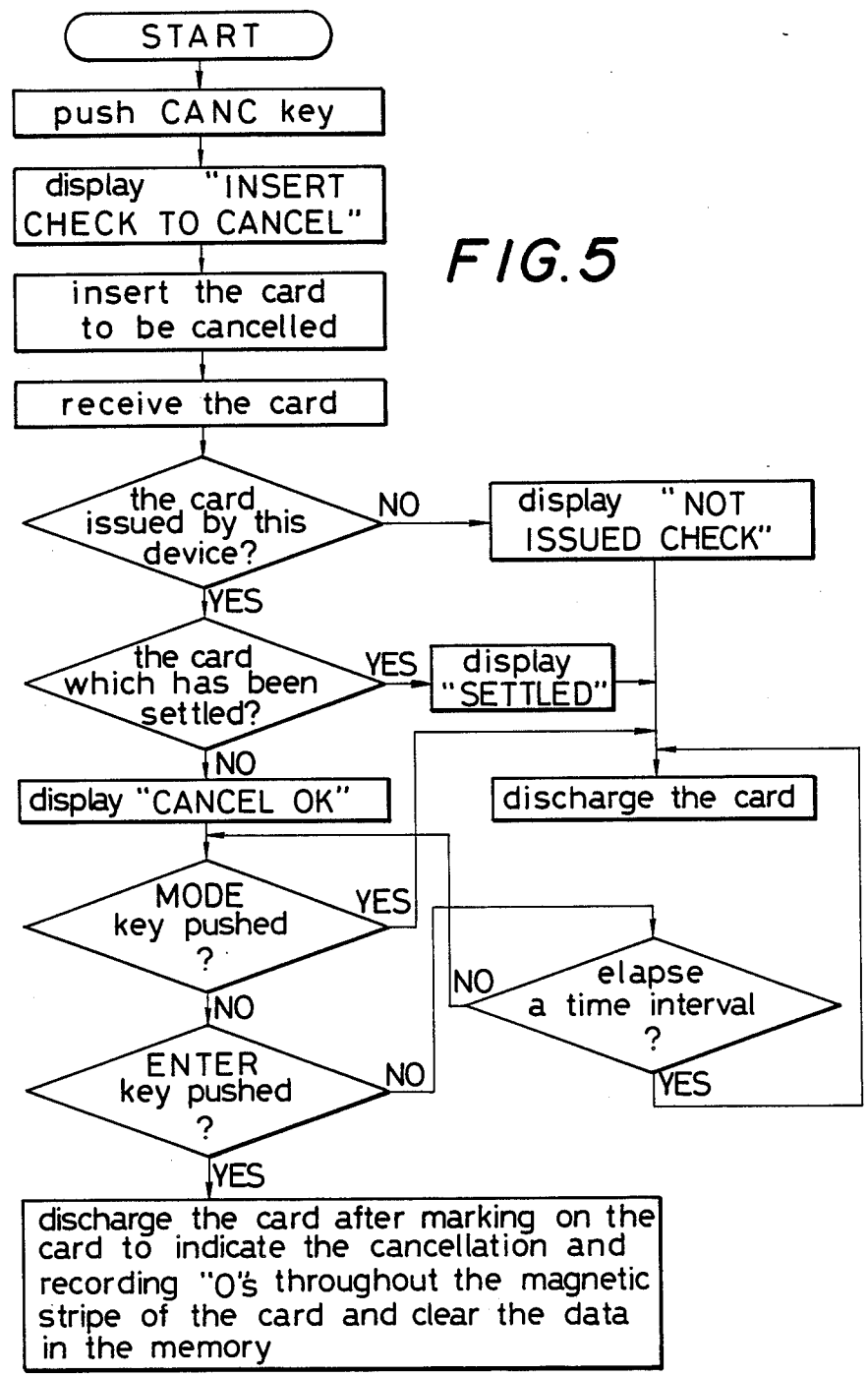
FIG. 5 is a flow chart for explaining a cancel mode.

The key operation for cancelling a check card 1A and corresponding operation of the apparatus will be described with reference to the flow chart in FIG. 5.

When the cancel key 26 (FIG. 4) is pushed, a display instructing insertion of a check card is provided. A check card 1A to be canceled is inserted into the port 13 of the check card issuance apparatus 10. When the check card 1A is inserted into the apparatus 10, it is first checked, in accordance with data stored in its magnetic stripe and corresponding data in the memory 17, if the check card 1A is issued by this particular apparatus 10. If it is determined that the check card 1A was not issued by the apparatus 10, a corresponding message is provided and the card 1A is discharged.

If it is determined that the card 1A was issued by the apparatus 10, it is then checked to determine if the card 1A has been settled, or canceled, in a bank or the like. If so, a corresponding message is displayed and the card 1A is discharged. If the card 1A has not been settled, a message "Cancel OK" is provided. When cancellation is to be stopped after this OK message is provided, the mode selection key 21 is pushed to select another mode. Then, the card 1A is discharged. If the mode selection key 21 is not pushed within a predetermined period of time, it is interpreted that a cancellation request has been stopped and the card 1A is discharged. However, when cancellation is to be continued, the enter key 25 is pushed. Then, the check card 1A in which the cancellation indication is provided in the printing area 4 is discharged. The data in the magnetic stripe 2 of the discharged card 1A is all "0's". At the same time, the data corresponding to the card 1A and stored in the memory 17 is also erased.

In this manner, cancellation of the check card 1A can be performed easily. The check card 1A cannot be reused once it has been canceled. In addition, the data in the memory 17 always coincides with the data on the check cards 1A which have been actually used.

With the apparatus of the present invention, processing can be performed with ease and safety by check issuers and financial institutions which must process checks. Since issuance and acceptance of checks is performed by reading characteristics data unique to each check card, safety against loss, and counterfeiting of check cards can be guaranteed, and illegal use thereof can be prevented. In addition, since the data on the date and amount of money of checks can be supplied to an external printer or the like, the issuance state to the present, current balance and the like can be easily checked without requiring keeping records on a book. Cancellation of a check card which has been issued is also easy. A check card which has been issued and which has not been settled can also be canceled. When a check card is canceled, corresponding data in a memory of the apparatus is also erased. For this reason, the data in the memory will correspond to that of the check cards which have actually been issued. The data on balance of incomings and outgoings can be stored.

The present invention is not limited to a check issuance apparatus and can be applied to issuance apparatuses for other types of cards.

We claim as our invention:

1. Apparatus for issuing a card comprising:
   (a) input means for taking in data necessary for issuing said card, said data including at least an identification of the issuing apparatus;
   (b) memory means for storing said data;
   (c) recording means for recording said data in machine readable form, on a portion of said card when said card is issued;
   (d) reading means for reading said data from said card;
   (e) said input means including a cancellation key;
   (f) means responsive to operation of said cancellation key and to recognition of the identification of the issuing apparatus for cancelling said data stored in said memory and recording on said card a message that recorded data has been cancelled;
   (g) comparison means for comparing said data recorded on said card with said data stored in said memory means and inhibiting means for inhibiting cancellation in response to a noncomparison of predetermined constant data with data read from said card, said inhibiting means being responsive to data which identifies that a transaction involving the card has been completed.

2. Apparatus according to claim 1, wherein said card is a check.

3. Apparatus according to claim 1, wherein said recording means is a magnetic head.

4. Apparatus according to claim 1, wherein said message is visibly put out on said card by a printer.

5. Apparatus according to claim 1, wherein said inhibiting means is responsive to constant data which identifies the apparatus used for issuing said card.

6. Apparatus according to claim 1, including means for overwriting recorded data on said card.

7. Apparatus according to claim 6, including means for overwriting said prerecorded data with zeros.

8. Apparatus according to claim 1, including means for adjusting the content of said memory in response to data recorded on said card.

* * * * *